United States Patent Office 3,491,072
Patented Jan. 20, 1970

3,491,072
METHOD FOR PREPARING POLYETHYLENE TEREPHTHALATE USING HYDROXIDE DIRECT ESTERIFICATION CATALYSTS
John A. Price, Swarthmore, Pa., and Robert P. Mervine, Wilmington, Del., assignors to FMC Corporation, Philadelphia, Pa., a corporation of Delaware
No Drawing. Filed Nov. 15, 1966, Ser. No. 594,416
Int. Cl. C08g *17/003, 17/08*
U.S. Cl. 260—75                                      8 Claims

ABSTRACT OF THE DISCLOSURE

Process of preparing polyethylene terephthalate comprising carrying out a direct esterification reaction between terephthalic acid and ethylene glycol in the presence of a metal hydroxide or an organo-metal hydroxide and polycondensing the resulting product.

---

This invention relates to a method of preparing linear polyesters. In particular, it relates to a method of preparing polyethylene terephthalate resin having excellent filament-forming properties.

The manufacture of polyester resin from a dicarboxylic acid and a diol is well-known in the art. Generally, in the preparation of such polyesters, a dicarboxylic acid and glycol are first combined and subjected to a direct esterification reaction. The resulting product or prepolymer is then polycondensed at higher temperatures and under reduced pressure in the presence of a polycondensation catalyst to form the polyester resin.

Various additives have been suggested heretofore for use in the first stage or esterification step to enhance the reaction. However, generally, none of these have proved entirely satisfactory since many of those known, for instance, are not capable of producing suitable prepolymers for preparing linear polyester resins having sufficiently high molecular weights within a relatively short reaction period. From a commercial standpoint, it is essential that a polyester resin be produced in the shortest possible time and that the desired degree of polymerization be obtained. A polyethylene terephthalate resin suitable for melt spinning into filaments should have a carboxyl content value of about or below 50 equivalents per million grams (eq./10$^6$ gr. or meq./kg.) and an intrinsic viscosity preferably not less than about 0.60 (as determined in a 60% phenol and 40% tetrachloroethane solution, wt./wt., at 30° C.).

It is an object of this invention to prepare polyethylene terephthalate resin suitable for melt extrusion into non-degraded processable filaments by a direct esterification and polycondensation procedure.

Another object of the present invention is to provide an improved method for completing the direct esterification reaction between ethylene glycol and terephthalic acid in the preparation of polyethylene terephthalate.

These and other objects are accomplished in accordance with the present invention which involves a method of preparing filament-forming polyethylene terephthalate wherein the terephthalic acid and ethylene glycol are directly esterified and the product of esterification is polycondensed in the presence of a condensation catalyst, the improvement comprising carrying out the direct esterification reaction in the presence of a metal hydroxide or organo-metal hydroxide in an amount sufficient to improve the properties of the resulting polyester.

The metal hydroxide or organo-metal hydroxide used in the direct esterification step of the present invention may be suitably varied to meet any requirements of reaction conditions and desired product. While the present invention is not limited to any particular metal hydroxide or organo-metal hydroxide, it has been found that the preferred hydroxides are those wherein the metal component thereof is selected from the group consisting of cerium and metals from Groups IV–A, II–B, and VIII of the Periodic Table (see Merck Index, sixth edition, inside front cover). For example, among the first stage or esterification additives which can be used in accordance with the present method are cadmium hydroxide, ceric hydroxide, cobalt hydroxide, lead hydroxide, zinc hydroxide, zirconium hydroxide, and phenyl mercuric hydroxide.

Generally, a catalytic quantity of a metal hydroxide or organo-metal hydroxide in the range of from about $5 \times 10^{-6}$ to about $5 \times 10^{-2}$ mole per mole of terephthalic acid in the subject terephthalic acid-ethylene glycol reaction mixture is used in the present direct esterification method. Higher or lower concentrations of the present catalysts can also be employed. However, when concentrations less than the above are used, their effectiveness is generally reduced, whereas if concentrations greater than this are used, no further improvement in the present method or desired product is generally obtained.

In general, the preparation of filament-forming polyesters of the present invention via the direct esterification reaction is carried out with a molar ratio of ethylene glycol to terephthalic acid from about 1:1 to about 15:1 but preferably from about 1.2:1 to about 2.5:1. The first stage direct esterification step of the present method is generally carried out at temperatures ranging from about 220° C. to about 290° C. in the absence of an oxygen containing gas at atmospheric or elevated pressure for about two to four hours. For example, the reaction may be carried out in an atmosphere of nitrogen. When the direct esterification step is completed, as indicated by the formation of a clear reaction mixture, any remaining glycol is distilled off and a polycondensation catalyst is added to the esterified reaction product. The second stage or polycondensation step of the present method is generally carried out under reduced pressure within the range of from about 0.05 to 20 mm. of mercury in the absence of an oxygen containing gas at temperatures from about 260° to 325° C., for about two to six hours.

The polycondensation step of the present method is accomplished through the use of a conventional condensation catalyst, for example, antimony trioxide and the like. The polycondensation catalyst may be added to the present reaction mixture before initiating the first stage or direct esterification reaction between ethylene glycol and terephthalic acid, if indicated, or after the reaction product thereof is formed. The polycondensation catalysts are generally employed in concentrations ranging from about 0.005 to about 0.5%, based on the total weight of the reactants.

The process of this invention may be carried out either continuously or batch-wise.

The following examples of several preferred embodiments will further serve to illustrate the present invention. All parts are by weight unless otherwise indicated.

Examples

A mixture containing 84 grams (0.5 mole) of terephthalic acid, 62 grams (1.0 mole) of ethylene glycol, and $5 \times 10^{-5}$ mole of a metal hydroxide or organo-metal hydroxide, as listed in the following table with the exact weight used in the above reaction mixture, was charged to a Fischer-Porter pressure assembly equipped with a nitrogen sparge tube and a distilling arm. The reactor was lowered into an oil bath maintained at 260° C. and flushed for ten minutes with dry nitrogen. A nitrogen pressure of 60 p.s.i. was applied and a distillate of water-ethylene glycol was collected. When a clear liquid, i.e. solution of the reaction mixture was obtained, the pressure was reduced to atmospheric and the remaining excess glycol was distilled. The resulting low molecular weight prepolymer was further reacted in the presence of 0.04%, based on the weight of the prepolymer, of a conventional polycondensation catalyst, e.g. antimony trioxide or antimony trisulfide, under subatmospheric pressure of about 0.1 mm. of mercury for about four hours at 282° C. to form a polyester resin.

The following table sets forth conditions and results of various reactions carried out as described above.

condensed in the presence of a polycondensation catalyst, the improvement comprising carrying out the direct esterification reaction in the presence of a catalytic quantity of a metal hydroxide or phenyl mercuric hydroxide direct esterification catalytic additive wherein the metal component of the said hydroxide is selected from the group consisting of cerium, and metals from Groups IV-A, II-B, and VIII of the Periodic Table (Merck Index, Sixth Edition).

2. The method of claim 1 wherein the hydroxide is

TABLE

| Ex. No. | Esterification Additive | Weight of Esterification Additive Used (gm.) | Esterification Time, Hrs.:Min. | Prepolymer Carboxyl Content, meq./kg. | Condensation Catalyst | Intrinsic Viscosity | Polymer Carboxyl Content, meq./kg. |
|---|---|---|---|---|---|---|---|
| 1 | None | | 3:41 | 316 | | 0.36 | |
| 3 | Cadmium Hydroxide | 0.0073 | 2:50 | 147 | $Sb_2O_3$ | 1.05 | 24.2 |
| 4 | Ceric Hydroxide | 0.0106 | 2:55 | 145 | $Sb_2O_3$ | 1.10 | 26.4 |
| 5 | Cobalt Hydroxide | 0.0046 | 2:35 | 150 | $Sb_2S_3$ | 0.80 | 22.4 |
| | | | | | $Sb_2O_3$ | 0.90 | 43.0 |
| 6 | Lead Hydroxide | 0.0120 | 3:10 | 87 | $Sb_2O_3$ | 1.09 | 22.9 |
| 7 | Lithium Hydroxide | 0.0012 | 2:45 | 80 | $Sb_2S_3$ | 0.71 | 39.1 |
| | | | | | $Sb_2O_3$ | 1.00 | 28.9 |
| 8 | Zinc Hydroxide | 0.0049 | 3:10 | 90 | $Sb_2O_3$ | 0.61 | 60.0 |
| 9 | Zirconium Hydroxide | 0.0079 | 2:30 | 149 | $Sb_2O_3$ | 0.77 | 23.0 |
| 10 | Phenyl Mercuric Hydroxide | 0.0147 | 2:30 | 228 | $Sb_2S_3$ | 0.78 | 31.4 |

The intrinsic viscosity of the polyester products of the above examples were measured in a 60% phenol and 40% tetrachloroethane solution (wt./wt.) at 30° C.

The results shown in the above table indicate that the presence of a metal hydroxide or organo-metal hydroxide during the direct esterification step in the production of filament-forming polyester resin, in general, facilitates the preparation of and improves the prepolymer formed and in turn the polyester resin product. Through the use of such an additive, the direct esterification reaction time is reduced and the resulting prepolymer is, in general, characterized as being a more highly esterified product than one produced when no esterification additive is used as indicated by the carboxyl content of the prepolymers. Further, the prepolymers of the present method can be condensed to yield polyester resins which have high molecular weights as indicated by their intrinsic viscosity. Such resins can suitably be made into filaments and/or films.

While the present process has been described with particular reference to polyethylene terephthalate, it will be obvious that the subject invention includes within its scope the preparation of other polymeric polymethylene terephthalates prepared from glycols of the series $HO(CH_2)_nOH$, where $n$ is 2 to 10 and terephthalic acid and copolyesters containing varied amounts of other suitable dicarboxylic acids such as isophthalic acid.

We claim:
1. A method for preparing polyethylene terephthalate resin wherein terephthalic acid and ethylene glycol are directly esterified and the product of esterification is polypresent in an amount ranging from about $5 \times 10^{-6}$ to about $5 \times 10^{-2}$ mole per mole of terephthalic acid.

3. The method of claim 1 wherein the hydroxide is cadmium hydroxide.

4. The method of claim 1 wherein the hydroxide is ceric hydroxide.

5. The method of claim 1 wherein the hydroxide is cobalt hydroxide.

6. The method of claim 1 wherein the hydroxide is lead hydroxide.

7. The method of claim 1 wherein the hydroxide is zinc hydroxide.

8. The method of claim 1 wherein the hydroxide is phenyl mercuric hydroxide.

References Cited

UNITED STATES PATENTS

| 2,643,989 | 6/1953 | Auspos | 260—75 |
| 3,050,533 | 8/1962 | Munro et al. | 260—75 |
| 3,050,548 | 8/1962 | Munro et al. | 260—75 |
| 3,055,869 | 9/1962 | Wilson et al. | 260—75 |
| 3,056,817 | 10/1962 | Werber | 260—75 XR |
| 3,056,818 | 10/1962 | Werber | 260—75 XR |

WILLIAM H. SHORT, Primary Examiner

LOUISE P. QUAST, Assistant Examiner

U.S. Cl. X.R.

260—475